(12) United States Patent
Kasuga (10) Patent No.: US 7,938,467 B2
(45) Date of Patent: May 10, 2011

(54) LOAD WEIGHTING CONTROL APPARATUS

(76) Inventor: Hiroshi Kasuga, Hirakata (JP)

( * ) Notice: Subject to any disclaimer, the term of this patent is extended or adjusted under 35 U.S.C. 154(b) by 0 days.

(21) Appl. No.: 12/462,957

(22) Filed: Aug. 12, 2009

(65) Prior Publication Data

US 2011/0036673 A1    Feb. 17, 2011

(51) Int. Cl.
*A47J 45/00* (2006.01)
*F16F 3/00* (2006.01)
(52) U.S. Cl. .......... 294/64.1; 267/75; 267/118; 267/124
(58) Field of Classification Search .......... 188/310–312; 294/64.1–64.3, 65; 414/627; 267/64.11, 267/67, 75, 118, 124, 130
See application file for complete search history.

(56) References Cited

U.S. PATENT DOCUMENTS

| | | | | |
|---|---|---|---|---|
| 3,431,010 A | * | 3/1969 | Glanemann | 294/64.1 |
| 3,677,598 A | * | 7/1972 | Becker | 294/64.1 |
| 3,759,560 A | * | 9/1973 | Yoda et al. | 294/64.1 |
| 3,785,691 A | * | 1/1974 | Sperry | 294/64.1 |
| 3,801,147 A | * | 4/1974 | Barrett et al. | 293/9 |
| 4,883,262 A | * | 11/1989 | Calvert | 267/175 |
| 7,543,868 B1 | * | 6/2009 | Mongan | 294/64.1 |

FOREIGN PATENT DOCUMENTS

| | | |
|---|---|---|
| JP | 2002-257172 | 9/2002 |
| JP | 3934215 | 6/2007 |
| JP | 2009-2508 | 1/2009 |

* cited by examiner

*Primary Examiner* — Christopher P Schwartz
(74) *Attorney, Agent, or Firm* — Jordan and Hamburg LLP (57) ABSTRACT

A load weighting control apparatus that suppresses deterioration of a controlled object due to impacts or the like during control, and for which energy usage costs required for control are markedly reduced, and that has a simple structure and therefore inexpensive manufacturing costs and running costs. The apparatus includes a main vacuum cylinder provided with a cylinder tube, end walls, an air vent that passes through one end wall, a valve that is provided in the air vent and serves to open/tightly close the atmosphere inside of the cylinder tube to the outside, a piston that slides back and forth within the cylinder tube, and a piston rod that is linked to the piston and passes through the other end wall and an auxiliary vacuum cylinder that includes a slacking portion where a piston rod produces slackness in the main vacuum cylinder.

3 Claims, 7 Drawing Sheets

LOAD WEIGHTING CONTROL APPARATUS

BACKGROUND OF THE INVENTION

The present invention relates to a load weighting control apparatus that controls a weighting load applied to an object.

Conventional technology for performing load weighting control centers mainly on configurations employing impact absorption or mitigation, in which a spring, oil pressure, or air is used. A major aim of the conventional technology is maintenance of the shape of a controlled object and maintaining and insuring balance by mitigating an impact.

Figure 6:
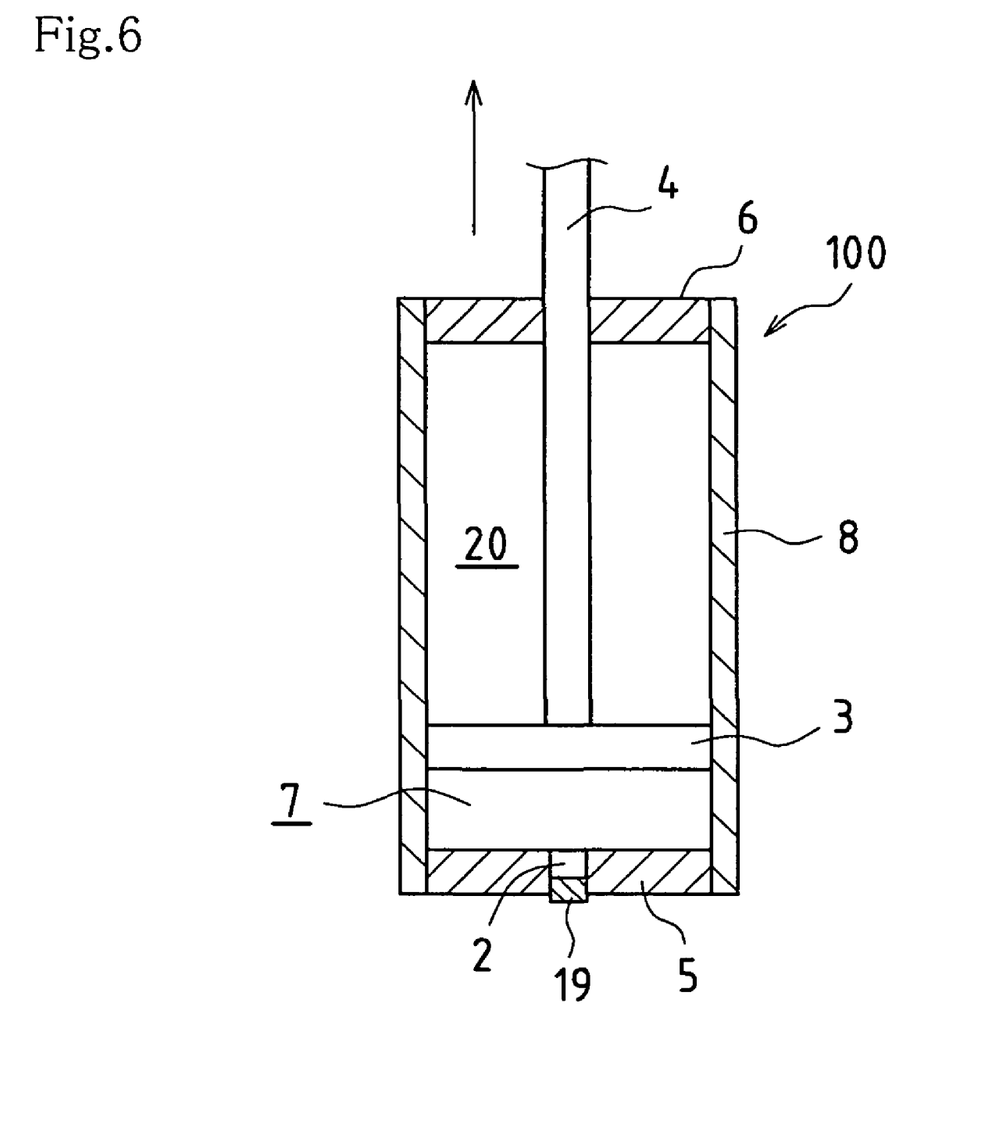
FIG. 6 illustrates a principle of a vacuum cylinder applied in the present application.
Figure 7:
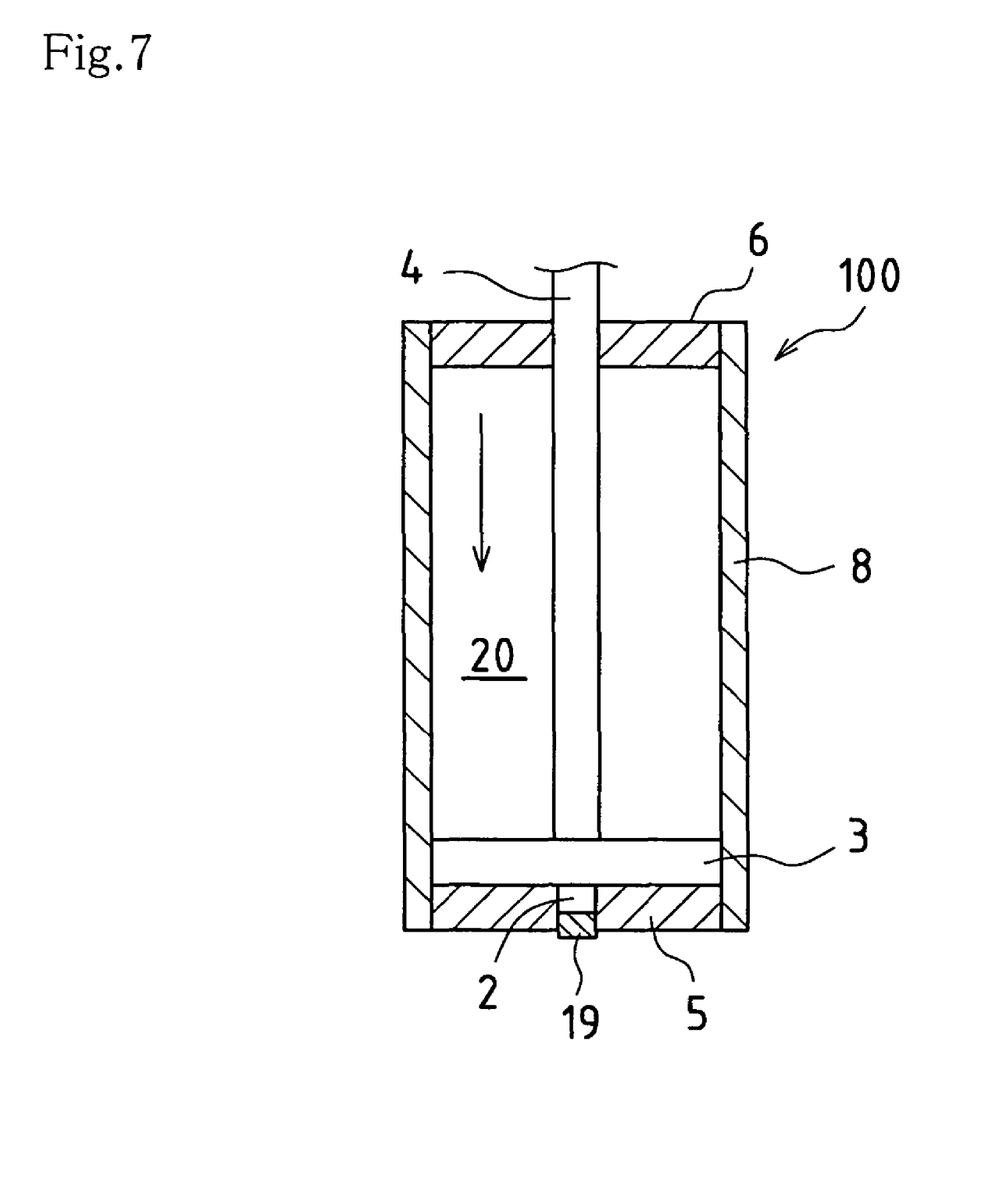
FIG. 7 illustrates a principle of a vacuum cylinder applied in the present application.

Also, as disclosed in JP 3934215B, there is a vacuum cylinder in which vacuum suction force is used as an attractive or suction load of a controlled object. FIG. 6 is a cross-sectional view that shows such a vacuum cylinder, and shows a state in which a piston has been pulled upward to form a vacuum chamber. FIG. 7 shows a state in which the piston has been closely fitted to a lower end wall.

A vacuum cylinder 100 is provided with a cylinder main body configured from a cylinder tube 8, one end wall 5 and another end wall 6 that respectively close both ends of the cylinder tube 8, a piston 3 that slides back and forth within the cylinder tube 8, and a piston rod 4 that is linked to the piston 3. The piston rod 4 is provided in a state passing through the other end wall 6, and along with back and forth sliding of the piston 3, operates back and forth. An air vent 2 where air is discharged outside of the cylinder main body is formed in the one end wall 5, a valve 19 capable of opening/closing is provided in the air vent 2, and thus the inside of the cylinder tube 8 is opened or tightly closed. In this configuration, after the piston 3 is closely fitted to the one end wall 5 and the valve 19 is put in a closed state as shown in FIG. 7, due to the pressure difference between a vacuum chamber 7 in a vacuum state formed between the piston 3 and the one end wall 5 by sliding the piston 3 in the opposite direction as that closely fitted side as shown in FIG. 6, and an atmospheric chamber 20 with an atmospheric pressure, a load occurs on the piston 3.

However, in the above technology, there is a limit to the range of effects obtained according to the aims of that technology. For example, when a new impact has been received during control, the controlled object weighting load appropriately increases according to the size of that impact, and to that extent, the amount of energy usage necessary for control increases.

SUMMARY OF THE INVENTION

The present invention was made in view of the above problems, and it is an aim of the present invention to provide a load weighting control apparatus that, by using/adopting a vacuum principle to convert an appropriate amount of force calculated by a vacuum response from a controlled object weighting load to stress at another position, suppresses deterioration of a controlled object, and furthermore, markedly reduces the amount of energy usage necessary for control, and that also has a simple structure and therefore inexpensive manufacturing costs and running costs.

In order to attain the above aims, the load weighting control apparatus of the present invention is configured with a main vacuum cylinder and an auxiliary vacuum cylinder.

The main vacuum cylinder is provided with a cylinder tube, end walls that respectively close both ends of the cylinder tube, an air vent that passes through one end wall and serves to discharge air outside of the cylinder tube, an opening/closing means that is provided in the air vent and serves to open/tightly close the atmosphere inside of the cylinder tube to the outside, a piston that slides back and forth within the cylinder tube, and a piston rod that is linked to the piston and passes through the other end wall.

On the other hand, the auxiliary vacuum cylinder differs from the main vacuum cylinder by including a slackening portion where the piston rod produces slackness.

The cylinder tube of the main vacuum cylinder and the cylinder tube of the auxiliary vacuum cylinder are linked via a side wall of each cylinder tube, and thus formed as a single body. A through hole is formed in the cylinder tube side wall.

Furthermore, a fixing means that fixes the respective cylinder tubes from outside is provided in order to generate/induce a stress separate from acting/counteracting force that occurs on the piston.

In the load weighting control apparatus of the present invention, a vacuum is established within the cylinder tube between one end wall of the main vacuum cylinder and the piston by sliding of the piston of the main vacuum cylinder, and thus a load occurs on the piston. Also, a shared vacuum chamber is formed in both vacuum cylinders via the through hole, and a slackness condition is set such that at least at the time when the shared vacuum chamber has been formed, there is no slackness of the piston rod of the auxiliary vacuum cylinder. The piston rods that pass through the respective other end walls are linked to piston rod extended portions that are formed in a shape bending in the opposite direction as the other end walls, with a predetermined gap from outside side walls of the cylinder tubes being formed in order to allow the separate stress to be produced, and by these piston rod extended portions, a weighting load from outside is directly received by at least the piston rod of the main vacuum cylinder.

The length of the piston rod from the position of the outer face of the one end wall of the main vacuum cylinder in a state in which the piston of the main vacuum cylinder has been closely fitted to the one end wall is made longer than the movable distance of the piston of the main vacuum cylinder in the piston tube. The length of the piston rod from the position of the outer face of the one end wall of the auxiliary vacuum cylinder in a state in which the piston of the auxiliary vacuum cylinder has been closely fitted to the one end wall is made longer than the movable distance of the piston of the auxiliary vacuum cylinder in the piston tube.

Furthermore, the radius of each piston is set such that a vacuum resistance load that is appropriate to the area of each piston occurs against the weighting load applied to the entire piston rod.

In the load weighting control apparatus of the present invention, due to a weighting load from outside being directly received by at least the piston rod of the main vacuum cylinder, which is linked to the piston rod extended portion, the vacuum load that occurs on each piston is negated by action/counteraction. Also, without moving the object, via the fixing means, a vacuum load amount equivalent to a resistance load amount appropriate for the vacuum load that has occurred on each piston can be converted to stress at another position that is made a separate force from the force that is negated by action/counteraction.

A structure is adopted in which the piston rod of the main vacuum cylinder and the piston are directly linked. On the other hand, a structure is adopted in which the piston rod of the auxiliary vacuum cylinder includes a slackening portion. This slackening portion, specifically, is configured with a cord, a chain, or the like, and may be installed at any location between the piston and the piston rod or in the piston rod. The force of the piston rod is not transmitted to the piston until slackness of the slackening portion has been eliminated, but when the slackness is eliminated, the force of the piston rod is transmitted to the piston via the slackening portion, and thus the piston of the auxiliary vacuum cylinder moves. The piston follows movement of the piston rod and slides within the auxiliary vacuum cylinder to form a vacuum chamber.

Accordingly, first, the piston of the main vacuum cylinder slides when the piston rod of the main vacuum cylinder moves towards the other end wall. With this sliding, the piston rod of the auxiliary vacuum cylinder also moves together, but this movement is not transmitted to the piston until the slackness of the slackening portion is eliminated. Elimination of this slackness is performed at least when a shared vacuum chamber is formed in both vacuum cylinders via the through hole.

In the above-described operation, the through hole is in a state plugged by the piston of the main vacuum cylinder and/or the piston of the auxiliary vacuum cylinder, and when both vacuum cylinder pistons have passed the position of the through hole due to sliding of the piston of the main vacuum cylinder and/or the piston of the auxiliary vacuum cylinder, the through hole is opened to the shared vacuum chamber of both vacuum cylinders. At this time, a very small amount of air within the through hole flows into the shared vacuum that has been formed, but there is only a very small amount of that air, which does not have any effect on maintaining the vacuum of the vacuum chamber, so there is no reduction in functioning of the vacuum cylinder.

By the above process, ultimately, in a state in which the shared vacuum chamber has been formed, a vacuum resistance load appropriate to the area of each piston occurs against a weighting load applied to the entire piston rod, and a vacuum chamber load amount equivalent to a vacuum resistance load amount appropriate to the vacuum load that has occurred on each piston from the weighting load can be converted to stress at another position.

In the load weighting control apparatus of the present invention, a vacuum chamber is constructed within a cylinder by directly using self-weighting applied to a plate for piston sliding, and using the force of a load portion that occurs there as a repulsive force, force is returned to the plate, and thus self-weighting is appropriately suppressed/controlled, and further, a force equivalent to that controlled weighting is converted/moved to another position as stress. Accordingly, when functionality of this apparatus is considered, the maximum amount of force that can be controlled, and the range of force that can be handled, are important factors. The force of the load that can be controlled is determined in advance by the piston area, so when a single cylinder is used, the range of control is limited.

For example, in the case of a load weighting control apparatus configured with a single vacuum cylinder, when the piston area is set to 10 square centimeters, control feedback is caused by receiving a 10 kilogram weighting load, but feedback is not caused at a lesser weighting load. That is, 10 kilograms are approximately controlled in the case of weighting of at least 10 kilograms, but no feedback is caused for weighting of 9 kilograms.

On the other hand, with the load weighting control apparatus of the present invention, which is configured using both a main vacuum cylinder and an auxiliary vacuum cylinder, there are specific advantages as described below.

For example, when the area of the piston of the main vacuum cylinder is set to 6 square centimeters, and the area of the piston of the auxiliary vacuum cylinder is set to 4 square centimeters, the main vacuum cylinder causes control feedback from a 6 kilogram weighting load by the area of the piston of the main vacuum cylinder, and if furthermore the auxiliary vacuum cylinder causes feedback, a control force of 4 kilograms is newly added, so by combining the main vacuum cylinder and the auxiliary vacuum cylinder a total of 10 kilograms can be controlled. This indicates that the invention is very advantageous for load weighting control in a case where the load is variable. In this way, with a structure in which a shared vacuum chamber is formed and control is performed while operating the main vacuum cylinder and the auxiliary vacuum cylinder at different times, it is possible to further increase the breadth and amount of force that can be controlled, in comparison to using a single vacuum cylinder.

A configuration provided by one main vacuum cylinder and one auxiliary vacuum cylinder is described hereinafter.

First, a vacuum response initially occurs in a main vacuum cylinder formed such that a piston resistance load occurs that is smaller than the controlled object weighting load, the main vacuum cylinder receives the total weighting load of the controlled object, and thus the piston of the main vacuum cylinder and the cylinder tube are continually pulled away from the one end wall, so that first a sliding state is established.

Next, when preliminarily this sliding reaches a fixed range, a residual load of the controlled object that has exceeded the piston resistance load of the main vacuum cylinder causes a vacuum response in the auxiliary vacuum cylinder, which is linked to the main vacuum cylinder, the piston of the auxiliary vacuum cylinder also is separated from the one end wall, and the residual load of the controlled object is controlled with the resistance load of the piston of the auxiliary vacuum cylinder. In this configuration, the amount of the piston resistance load that occurs at this time exceeds the residual load of the controlled object, and the total amount of the piston resistance load of both the main vacuum cylinder and the auxiliary vacuum cylinder exceeds the total weighted amount of the controlled object. Thus, the controlled object weighting load is always controlled within the sliding range of the piston rod and cylinder tube of the main vacuum cylinder and the auxiliary vacuum cylinder. The reason this is easily done is that when the resistance load of the auxiliary vacuum cylinder exceeds the residual load of the controlled object, the piston and the cylinder tube move so as to fit closely together, but when, during that movement, the residual load of the controlled object is removed from the load weighting control range of the auxiliary vacuum cylinder, that state cannot be maintained with the resistance load of the main vacuum cylinder, and so the piston of the main vacuum cylinder again moves in the direction of the other end wall of the cylinder, and thus the remaining controlled object weighting load again enters the control range of the auxiliary vacuum cylinder and is controlled, and during the vacuum response, this is repeated indefinitely. By this action, even while the controlled object weighting value varies, the controlled object weighting value is controlled between the value of the piston resistance load of the main vacuum cylinder and the value of the piston resistance load of the auxiliary vacuum cylinder.

The load weighting control value that is converted to stress and removed from on each cylinder tube is at least the amount of the resistance load of the main vacuum cylinder, but this control value is proportional to the total piston cross-sectional area applied until immediately before the piston and the cylinder tube merge together and start to return in the overlapping direction, so the number of auxiliary vacuum cylinders that contribute to control is increased, and as the controlled object total weighting load and the total piston control value including the last auxiliary vacuum cylinder become closer in steps, the value of load weighting that is controlled increases, and furthermore, the breadth of control variation also may be reduced.

Also, in the load weighting control apparatus of the present invention, a plurality of the piston rods may be linked to the piston.

With this configuration, by dividing the controlled object weighting load into multiple component forces as necessary, effective load weighting control can be performed according to, for example, the shape and material of the controlled object, or the weight and environment, or the purpose of control. Conversely, this configuration is also compatible with the resultant force according to the above-described purposes. The reason for this is as described below.

As described above, the present invention was made based on natural laws using a vacuum cylinder, and the basis for control in the present invention is sliding of the piston rod and cylinder tube due to the vacuum response of the vacuum cylinder. In this configuration, furthermore, it is a feature that control of the weighting load of the controlled object is directly performed with that piston rod and cylinder tube. In addition, presence or absence of a control load occurs due to sliding of the same piston and cylinder tube. This means that the control efficiency is greatly influenced by the shape and manner in which some type of a control means such as a plate is connected to the piston rod and the cylinder tube. In the present configuration, by linking a plurality of piston rods, the piston rods can be utilized not only for self-weighting control of the vacuum load produced with the piston, but also in other facets as well. Specifically, a configuration in which there are a plurality of piston rods is advantageous in that not all of the piston rods are linked to the plate, rather, some of the piston rods are linked to another control means, and thus the vacuum load that occurs on the piston can be variously utilized as energy. Control of the load weighting control apparatus is made more advantageous according to the various usage states of such piston rods.

Furthermore, in the load weighting control apparatus of the present invention, a configuration may be adopted in which a shielding wall for stopping movement of the piston rod is formed as a single body with the fixing means, and the upper face of the shielding wall is positioned higher than the outer face of the one end wall.

With this configuration, it is possible to provide an equivalent uniform load weighting control for variable load weighting of a controlled object load. In vacuum response, as described above, a load corresponding to the piston cross-sectional area occurs on the piston, and this load is set in advance. Even while causing sliding of the piston and cylinder tube with a controlled object weighting load that exceeds that preset load, by intermediately restraining excessive sliding that occurs with a residual load that exceeds the preset load that has been set in advance, the set load portion that has been set in advance can be substantially controlled. As a means of doing so, a plate, bar, or other structural item may be disposed outside of the cylinder tube to block sliding. Therefore, during control, the above-described set load portion that has been set in advance from the controlled object weighting load can always be equivalently converted to stress, and thus the load on the cylinder tube can be reduced.

The shielding wall can also be utilized as a means of supplying the weighting load of the controlled object that has exceeded the vacuum load that occurred on the piston as the initial motion load of the other vacuum cylinder. As a result, a plurality of vacuum cylinders can be operated with the addition of one load weighting, and thus compound load weighting control that is applicable for many purposes is made possible.

According to the load weighting control apparatus of the present invention, a vacuum is formed using the weighting load of a controlled object itself, and a resistance load that occurs as a result acts as a counteraction on the controlled object, so the weighting load of the controlled object on the plate can be substantially set to approximately zero, and further, without moving the controlled object, load weighting control can be variously performed by converting, to stress at another position, a vacuum chamber load portion equivalent to a resistance load portion that corresponds to the vacuum load produced by the piston from the weighting load. In addition, energy is not needed for this. As a result, energy conservation can be realized, and manufacturing costs can be suppressed to a low level.

DETAILED DESCRIPTION OF THE INVENTION

First, in the present embodiment, a vacuum cylinder shown in FIGS. 6 and 7 is applied, and this structure is adopted as a basic principle.

Figure 1:
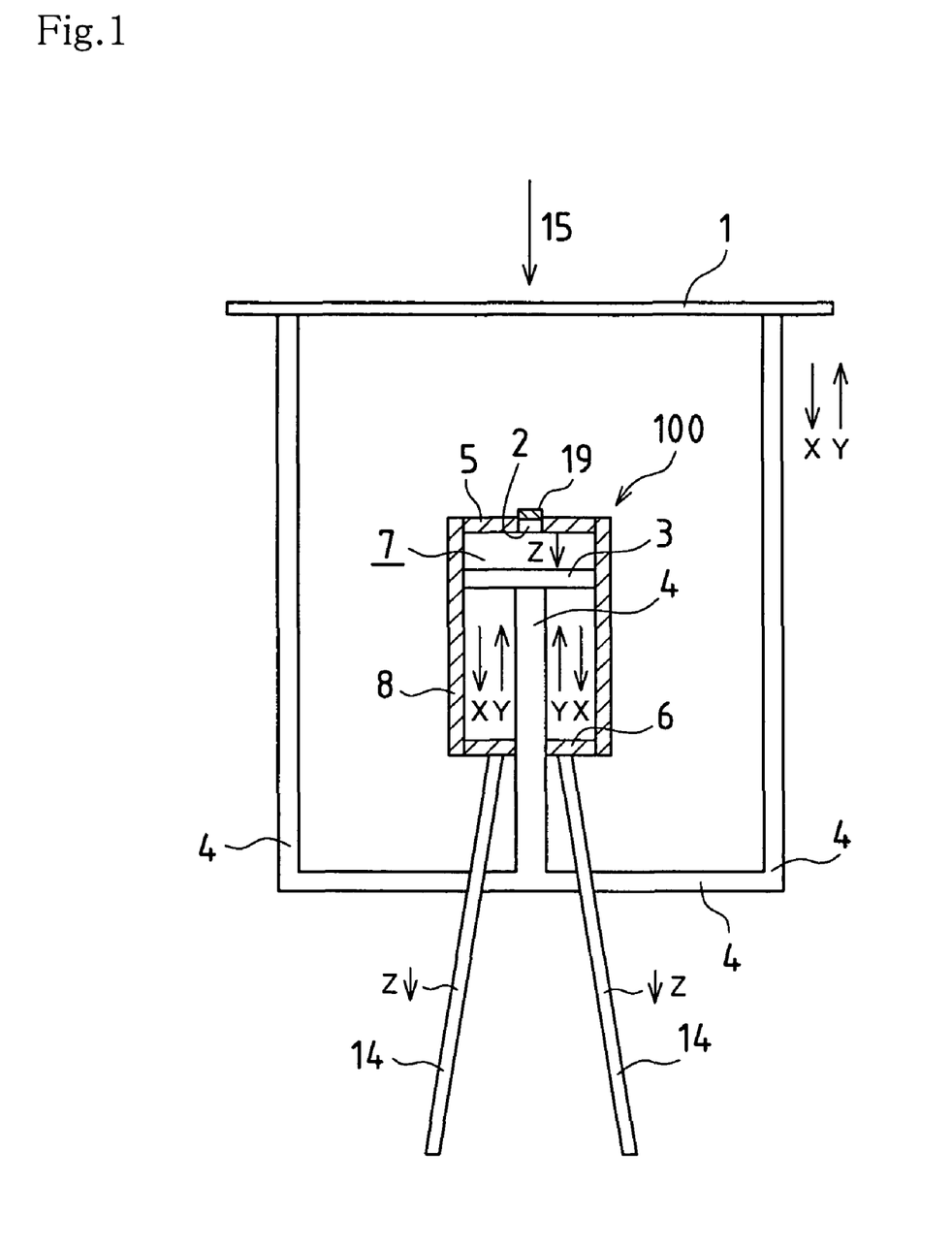
FIG. 1 is a cross-sectional view that shows a configuration related to a load weighting control apparatus of the present invention.

FIG. 1 is a cross-sectional view that shows a configuration related to a load weighting control apparatus of the present invention, and shows a state in which the load weighting control apparatus has been placed on the floor.

A single vacuum cylinder 100 is used in this apparatus. The vacuum cylinder 100 is provided with a cylinder tube 8, end walls 5 and 6 that respectively close both ends of the cylinder tube 8, an air vent 2 that passes through the one end wall 5 and is used to discharge air within the cylinder tube 8 to the outside, a valve 19 that is provided in the air vent 2 and is used to open/tightly close the atmosphere within the cylinder tube 8 to the outside, a piston 3 that slides back and forth within the cylinder tube 8, and a piston rod 4 that is linked to the piston 3 and is provided passing through the other end wall 6. In this vacuum cylinder 100, in a state in which the air vent 2 has been tightly closed by the valve 19 after tightly fitting the piston 3 to the one end wall 5, the piston 3 is slid in the direction of the other end wall 6 to establish a vacuum within the cylinder tube 8 between the one end wall 5 and the piston 3, and thus a load occurs on the piston 3.

Also, in the present apparatus, as a fixing means that fixes the cylinder tube 8 from the outside, cylinder legs 14 are provided on the outer face of the other end wall 6, and the piston rod 4, which passes through the other end wall 6, is formed in a shape adjacent to the cylinder tube 8 outside wall and separated from that outside wall by a predetermined distance. The length of the piston rod 4 from the position of the outer face of the one end wall 5 in a state in which the piston 3 is closely fitted to the one end wall 5 is longer than the distance that the piston 3 can move within the cylinder tube 8, and the radius of the piston 3 is set such that a vacuum resistance load appropriate for the piston area occurs against a weighting load on the entire piston rod. Thus, in the load weighting control apparatus, without moving the object, it is possible to convert a vacuum load amount equivalent to a resistance load amount appropriate to the vacuum load that has occurred on the piston from that weighting load to stress at another position. Also, an end portion of the piston rod 4 supports a plate 1.

With this apparatus having the above configuration, as shown in FIG. 1, after the valve 19 of the air vent 2 has been closed in a state in which the apparatus has been placed on the floor, the piston 3 is closely fitted to the one end wall 5, and then, as a result of the piston 3 being separated from the one end wall 5 by a controlled object weighting load 15 applied to the plate 1, a vacuum response begins, and thus a vacuum chamber 7 is formed. In this vacuum chamber 7, a load corresponding to the piston cross-sectional area is caused to occur on the piston 3 due to a pressure difference between the vacuum and the atmospheric pressure. With respect to that load, a state occurs in which a force is acting such that the piston 3 is pulled back in the direction of the one end wall 5. As shown in FIG. 1, a pull-back load due to formation of the vacuum chamber against a weighting load in the direction of arrow X via the piston rod 4 corresponds to a counteracting resistance load in the direction of arrow Y in the same piston rod 4. That is, as shown in FIG. 1, the piston rod 4 is directly linked to the plate 1 on the outside of the cylinder tube 8, and when the load of the controlled object is used to slide the piston 3 in the direction of the other end wall 6, the vacuum chamber 7 is formed between the one end wall 5 and the piston 3. A resistance load that occurs due to the difference between the vacuum and the atmospheric pressure is directed from the piston 3 towards the controlled object load via the piston rod 4 as a counteracting load. On the plate 1, that load amount is substantially negated from the controlled object weighting load, and at the same time stress indicated by arrow Z occurs at the one end wall 5, and that stress is transmitted to the cylinder legs 14. Thus, an appropriate resistance load amount that has occurred on the piston is negated from the load on the plate of the controlled object weighting load 15, and that load amount is converted to stress at the cylinder legs 14, which are at another position. This structure is a basic principle of the load weighting control apparatus of the present invention, and is the same also in embodiments described below.

FIG. 2 is a cross-sectional view that shows the configuration of an embodiment of the load weighting control apparatus of the present invention, and shows operation of this apparatus over time.

This apparatus, as shown in FIG. 2(*a*), has a main vacuum cylinder 101 that is provided with a cylinder tube 81, end walls 51 and 61 that respectively close both ends of the cylinder tube 81, an air vent 21 that passes through the one end wall 51 and is used to discharge air within the cylinder tube 81 to the outside, a valve 191 that is provided in the air vent 21 and is used to open/tightly close the atmosphere within the cylinder tube 81 to the outside, a piston 31 that slides back and forth within the cylinder tube 81, and a piston rod 91 that is linked to the piston 31 and is provided passing through the other end wall 61; and also has an auxiliary vacuum cylinder 102 that differs from the main vacuum cylinder 101 in that a piston rod 92 includes a slackening portion 17 that produces slackness of a chain, rope, cord, or the like, and is configured the same as the main vacuum cylinder 101 in other respects.

In other words, although the piston rod 91 and the piston 31 are directly linked in the structure of the main vacuum cylinder 101, the piston rod 92 is linked to a piston 32 via the slackening portion 17 in the structure of the auxiliary vacuum cylinder 102. The slackening portion 17 is covered by a pull-out piston rod cover 18 employing a spring mechanism such that it is possible to adapt to changes in the length of the slackening portion 17.

Also, cylinder legs 141 and 142 are provided that fix the cylinder tube 81 and a cylinder tube 82 from the outside.

Furthermore, the cylinder tube 81 of the main vacuum cylinder 101 and the cylinder tube 82 of the auxiliary vacuum cylinder 102 are linked via a side wall of each cylinder tube, and thus formed as a single body, and a through hole (pin hole) is formed in the side wall of the cylinder tube 81 (82).

This apparatus is configured so that by sliding of the piston 31 of the main vacuum cylinder 101, a vacuum is formed within the cylinder tube between the one end wall 51 and the piston 31, and thus a load occurs on the piston 31. Also, a shared vacuum chamber is formed in both vacuum cylinders 101 and 102 via a through hole 8A, and a slackness condition is set such that at least at the time when the shared vacuum chamber has been formed, there is no slackness of the slackening portion 17 of the piston rod 92 of the auxiliary vacuum cylinder 102.

Also, the piston rods 91 and 92 that respectively pass through the other end wall 61 and another end wall 62 are linked to piston rod extended portions 41 and 42, which are formed in a shape bending in the opposite direction as the other end walls, with a predetermined gap from outside side walls of the cylinder tubes 81 and 82 being formed.

Furthermore, the length of the piston rod 91 from the position of the outer face of the one end wall 51 of the main vacuum cylinder 101 in a state in which the piston 31 of the main vacuum cylinder 101 has been closely fitted to the one end wall 51 is made longer than the movable distance of the piston 31 of the main vacuum cylinder 101 in the piston tube 81.

The radius of the pistons 31 and 32 is set such that a resistance load that is appropriate to the area of each piston occurs against the weighting load on the entire piston rods 91, 92, 41, and 42.

With the above configuration, without moving the object, the controlled object weighting load 15 is converted to stress at another position, i.e., shifted to the cylinder legs 141 and 142.

In this apparatus, the main vacuum cylinder 101 is formed such that a piston resistance load occurs that is smaller than the controlled object weighting load 15 that initially causes the vacuum response. Also, the auxiliary vacuum cylinder 102 is configured such that a residual load of the controlled object that has exceeded the piston resistance load of the main vacuum cylinder 101 can be linked.

With the above structure, as shown in FIG. 2(*b*), when the controlled object weighting load 15 is applied to the plate 1, the piston rod 91 of the main vacuum cylinder 101 moves towards the other end wall 61, and the piston 31 of the main vacuum cylinder 101 slides. This operation is accompanied by movement of the piston rod of the auxiliary vacuum cylinder, and movement of the piston rod of the auxiliary vacuum cylinder continues until slackness of the slackening portion 17 is eliminated so that only the piston 31 slides. That is, the force of the piston rod 92 is not transmitted to the piston 32 until slackness of the slackening portion is eliminated.

Figure 2A:
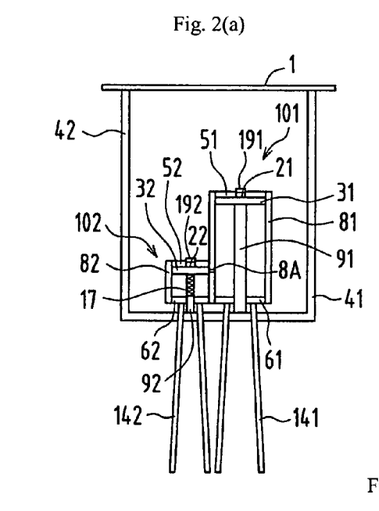
FIG. 2 is a cross-sectional view that shows an embodiment of the load weighting control apparatus of the present invention, and shows operation of this apparatus over time.
Figure 2B:
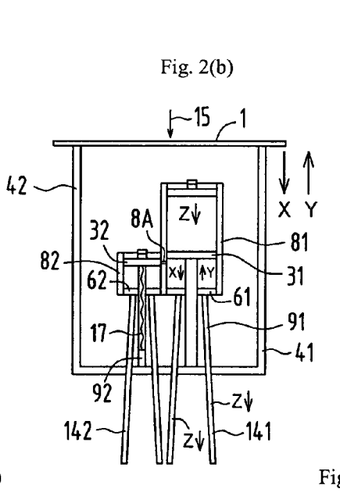
Figure 2C:
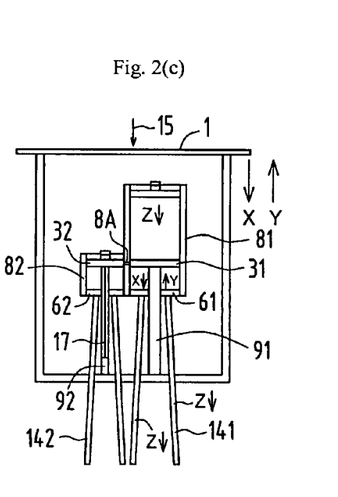

Here, when slackness is eliminated, as shown in FIG. 2(c), the force of the piston rod 92 is transmitted to the piston 32 via the slackening portion 17, so that the piston 32 of the auxiliary vacuum cylinder 102 can slide together with the piston 31. Elimination of slackness of the slackening portion 17 is performed at the time when the piston 31 has slid to a position flush with the piston 32.

Figure 2D:
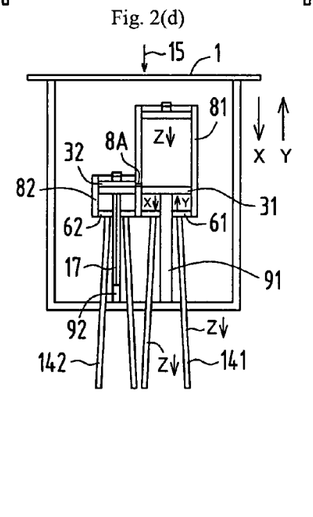
Figure 2E:
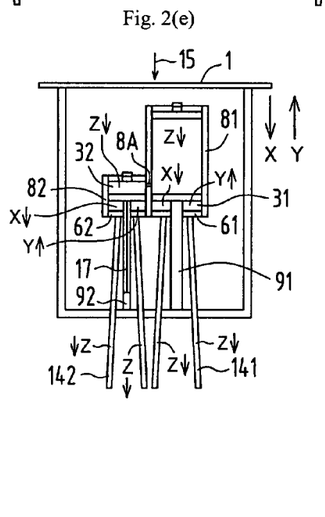

Afterward, as shown in FIG. 2(d), the pistons 31 and 32 slide together in a flush state, and when they have passed by the through hole 8A, the through hole 8A is opened to the vacuum chambers of both the main vacuum cylinder 101 and the auxiliary vacuum cylinder 102, so that a shared vacuum chamber is formed via the through hole 8A. At this time, air within the through hole 8A flows into the shared vacuum chamber, but the amount of air that flows in is small enough that the vacuum in the vacuum chamber can be maintained, so there is no effect on operation of the vacuum cylinders.

Further, as shown in FIGS. 2(a) and 2(b), when the auxiliary vacuum cylinder 102 is non-responsive, the through hole 8A is always plugged by the thickness of the piston 32 of the auxiliary vacuum cylinder 102. Therefore, with respect to sliding of the piston of either of the vacuum cylinders, air outside of the vacuum chamber does not newly flow in via the through hole 8A, rather, the slight amount of air that is initially present within the through hole 8A only creates a slight air wall within the vacuum chamber. Therefore, presence of a slight amount of air that is initially present within the through hole 8A, or the structure of the through hole 8A, does not result in an adverse effect so as to prevent vacuum response of the vacuum cylinders or maintaining of a vacuum.

Action/counteraction in this apparatus are indicated by arrows X and Y, and stress in the apparatus is indicated by arrow Z.

Figure 3:
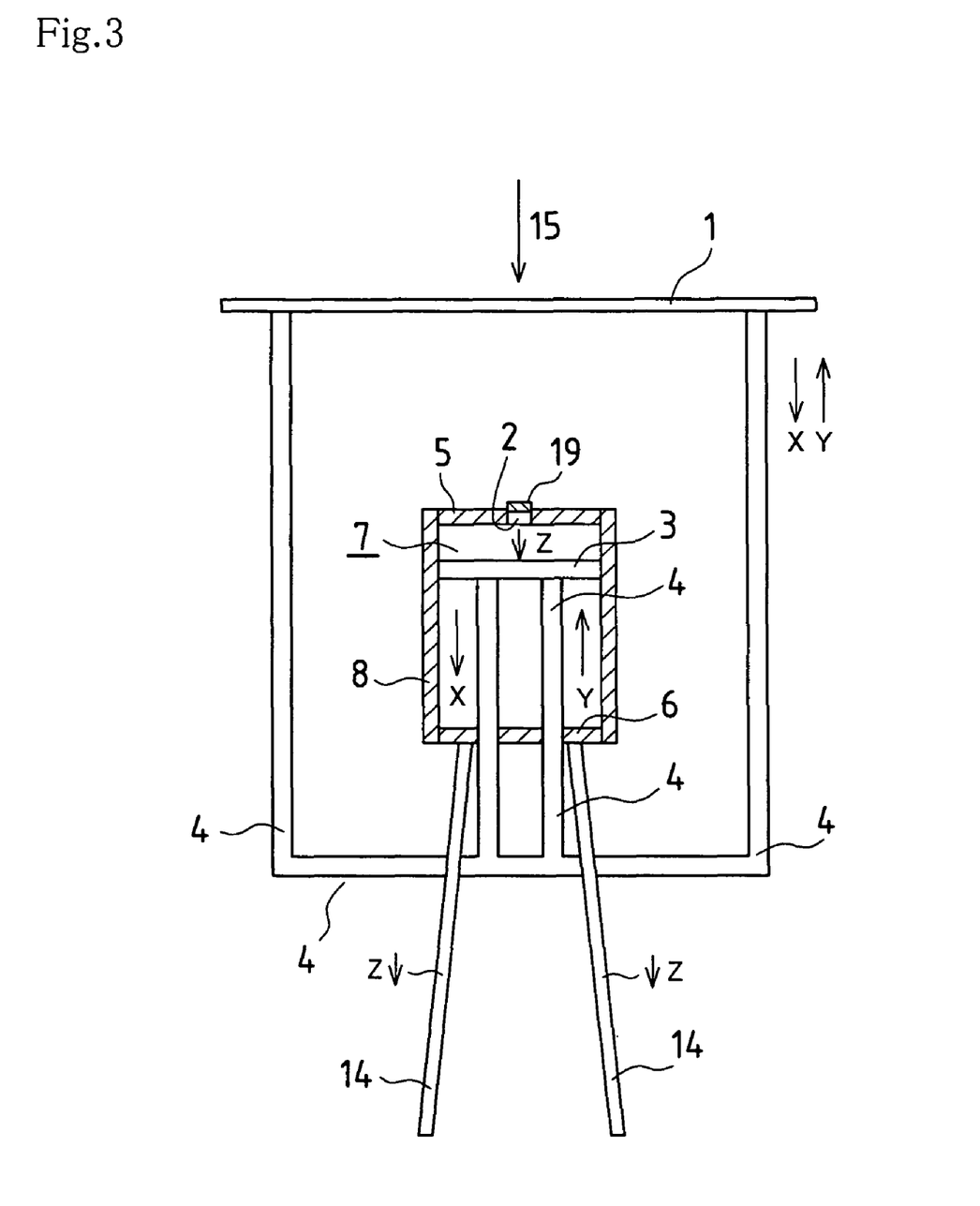
FIG. 3 is a cross-sectional view that shows a modified example of the load weighting control apparatus of the present invention.

FIG. 3 is a cross-sectional view for illustrating a modified example of the load weighting control apparatus of the present invention.

In this apparatus, in this configuration, the load applied to the piston 3 is stably transmitted via two piston rods 4.

Here, an example is described in which there are two piston rods extending from the piston 3, but this is not a limitation; there may be a plurality of three or more piston rods.

Figure 4:
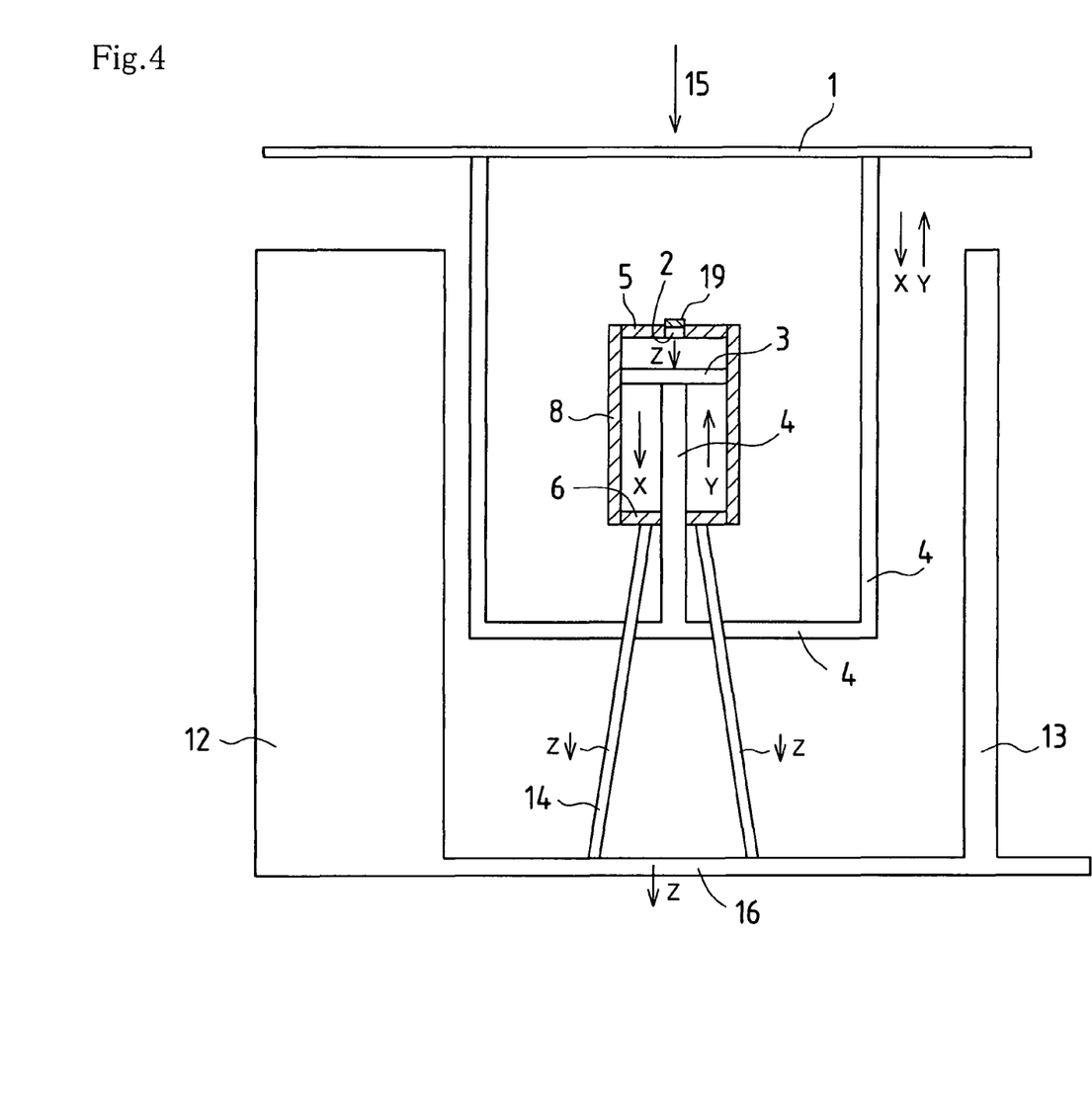
FIG. 4 is a cross-sectional view that shows another modified example of the load weighting control apparatus of the present invention.

FIG. 4 is a cross-sectional view for illustrating another modified example of the load weighting control apparatus of the present invention.

In this apparatus, a press blocking wall 12 and a press blocking pile 13 that have been formed as a single body with the cylinder legs 14 are provided on the outside of the cylinder tube 8 and the piston rod 4. The press blocking wall 12 and the press blocking pile 13 form a structure for stopping movement of the piston rod 4 within the cylinder tube 8. In the present embodiment, by providing the press blocking wall 12, it is possible to use the weighting load of the controlled object when stationary as the initial motion load necessary for a vacuum response, and further, the size of the installation location, freedom of the state of the apparatus, and the like are increased by the press blocking pile 13, so it is possible to design an apparatus with greater diversity of installation. The reason for this is that the press blocking wall 12 and the press blocking pile 13 are installed in order to receive, with a control means external to the vacuum cylinder, a residual load of the controlled object that is greater than the piston resistance load that has been calculated in advance. Therefore, the value of the piston resistance load of the apparatus may be less than the weighting load of the controlled object when stationary, and by also using the press blocking pile 13 for control separately from the press blocking wall 12, it is possible to install the apparatus in a small space. For the above reasons, the upper faces of the press blocking wall 12 and the press blocking pile 13 are located at a higher position than the outer face of the one end wall 5.

In the above configuration, variable load weighting control of the load on the controlled object is made possible, and furthermore, equivalent load weighting control is made possible. With respect to the vacuum response, as described above, a load corresponding to the piston cross-sectional area is caused to occur on the piston 3. This load is set in advance, and even if sliding of the piston 3 is caused to occur in the cylinder tube 8 with a controlled object weighting load that is greater than that preset load, by intermediately restraining excessive sliding that occurs with a residual load that exceeds the preset load, control is performed such that the controlled object residual load is substantially eliminated. In the present embodiment, a description is given of configuring a blocking means with a plate, a bar, or the like, but this is not a limitation; another structural item may be used as long as piston sliding is blocked. Thus, control can be performed such that the amount of the preset load is always equivalently removed from the controlled object weighting load.

Figure 5:
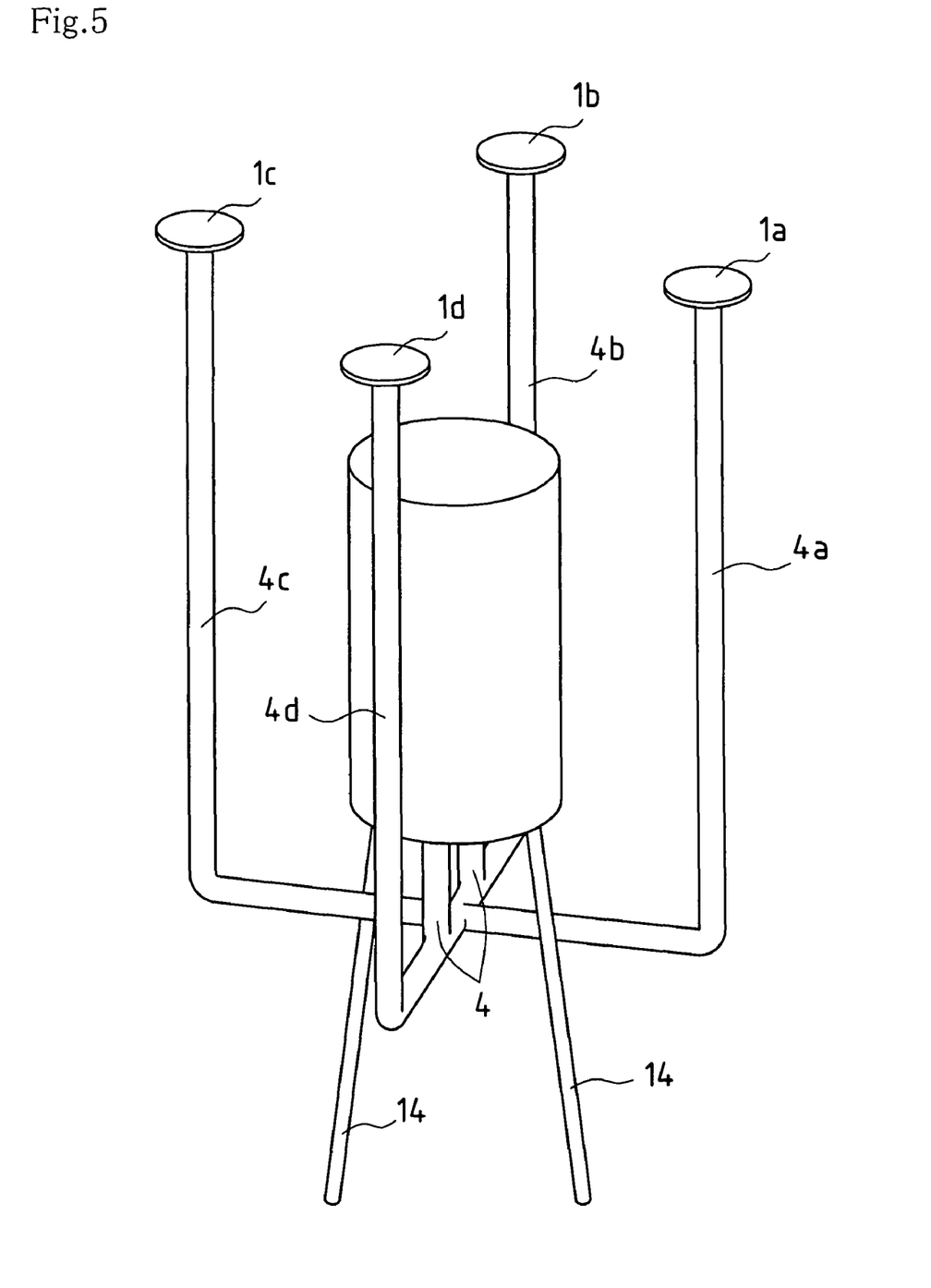
FIG. 5 is a perspective view that shows still another modified example of the load weighting control apparatus of the present invention.

FIG. 5 is a perspective view that shows still another modified example of the configuration of the load weighting control apparatus of the present invention.

In this apparatus, a plate on which a controlled object is placed is not provided, and support plates 1a, 1b, 1c, and 1d that are supported by an end of four cylinder rods 4a, 4b, 4c, and 4d that extend from cylinder rods 4 are provided; other aspects of the configuration are unchanged. With this apparatus, a structure is adopted in which the controlled object is placed on these support plates 1a, 1b, 1c, and 1d, and load weighting control can be realized in a state in which the contact area of the placed portion of the controlled object is reduced.

With the configuration of the present invention, it is possible to draw out the force that occurs at the border between a vacuum and atmospheric pressure as energy, and without added cost, possible to easily draw out and provide energy in any atmospheric environment. For example, when the present invention is used as a means of moving an object using sliding of a piston, it is specifically possible to realize automatic lift by vacuum energy, without using any conventional motive power source such as oil, gas, electricity, or the like. Furthermore, in a configuration employing back-and-forth movement of a piston with a structure in which a main cylinder and an auxiliary cylinder are a single body, the present invention is advantageous for semi-permanently producing energy. Also, shifting of force by conversion of a weighting load to stress makes it possible to avoid shape restrictions of various objects, and also allows an effective weight balance to be achieved. For example, when the present invention is utilized in the weight balance of an automobile or the like to change the location where weight actually occurs relative to the installation position of a seat or engine, there are significant effects of improving vehicle stability and therefore improving fuel efficiency, and so forth.

In this way, the present invention is very useful for making it possible to realize use of a vacuum principle in fields where such use was impossible in the conventional technology.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

The invention claimed is:

1. A load weighting control apparatus for controlling a weighting load applied to an object, comprising a main vacuum cylinder, an auxiliary vacuum cylinder, respective fixing means for each of the main vacuum cylinder and auxiliary vacuum cylinder, and a load transmitting portion, each one of the main vacuum cylinder and the auxiliary vacuum cylinder respectively comprising:
 a cylinder tube,
 end walls that respectively close both ends of the cylinder tube,
 an air vent that passes through one end wall and serves to discharge air outside of the cylinder tube,
 an opening/closing means that is provided in the air vent and serves to open/tightly close the atmosphere inside of the cylinder tube to the outside,
 a piston that slides back and forth within the cylinder tube, and
 a piston rod that is linked to the piston and passes through the other end wall;
 wherein the auxiliary vacuum cylinder further comprises an adjustable length slackening portion at the auxiliary vacuum cylinder piston rod;
 wherein the cylinder tube of the main vacuum cylinder and the cylinder tube of the auxiliary vacuum cylinder are formed as a single body linked via a side wall, a through hole formed in said side wall,
 wherein the respective fixing means maintain a fixed position of the respective cylinder tubes relative to the object to generate/induce a stress separate from an acting/counteracting force that occurs in the main vacuum cylinder's piston in response to the load weight of the weighting load;
 wherein a vacuum is established within the main vacuum cylinder's cylinder tube in a first space between said one end wall and the piston of said main vacuum cylinder, while the corresponding opening/closing means is closed, by sliding the main vacuum cylinder's piston, a load occurring on the sliding piston,
 wherein the established vacuum in said first space further encompasses a corresponding space in the auxiliary vacuum cylinder when said first space and said corresponding space are open to each other through the through hole, said first space and said corresponding space being open to each other via the through hole only after slackness is removed from the piston rod of the auxiliary vacuum cylinder,
 wherein the respective piston rods are linked to the load transmitting portion and the load weight is transmitted to at least the main vacuum cylinder's piston rod via the load transmitting portion, the load transmitting portion comprising first portions that are formed in a shape bending in the opposite direction as the other end walls, with a predetermined gap from outside side walls of the respective cylinder tubes being formed in order to allow the separate stress to be produced,
 wherein each respective piston rod has a length long enough to extend through said other end wall of it's corresponding cylinder tube when it's corresponding piston is closely fitted to said one end wall of it's corresponding cylinder tube,
 wherein the piston of the main vacuum cylinder has an area in accordance with a first radius and the piston of the auxiliary vacuum cylinder has an area in accordance with a second radius, said respective areas bearing an appropriate vacuum resistance load occurring in response to the load weight applied to the apparatus, and
 wherein respective vacuum resistance loads occurring on each respective piston are negated by action/counteraction, and without moving the object, via the respective fixing means, said respective vacuum resistance loads being converted to said separate stress at said fixing means.

2. The load weighting control apparatus according to claim 1, wherein a plurality of the piston rods are linked to the main vacuum cylinder's piston.

3. The load weighting control apparatus according to claim 1, wherein a shielding wall for stopping movement of the main vacuum cylinder's piston rod is formed as a single body with the corresponding fixing means, and an upper face of the shielding wall is positioned higher than an outer face of the main vacuum cylinder's said one end wall.

* * * * *